United States Patent [19]

Corrado et al.

[11] 4,294,748

[45] Oct. 13, 1981

[54] LOW VISCOSITY UNSATURATED POLYESTER RESINS

[76] Inventors: Giovanni Corrado, 190, Via Gentile da Mogliano, Roma; Elvio Bertotti, 45, Corso Garibaldi, Colleferro, Roma; Bruno Sopino, 21, Via Belvedere, Colleferro, all of Italy

[21] Appl. No.: 107,708

[22] Filed: Dec. 27, 1979

[30] Foreign Application Priority Data

Dec. 29, 1978 [IT] Italy ............................... 31404 A/78

[51] Int. Cl.$^3$ ...................... C08L 91/00; C08G 63/52
[52] U.S. Cl. ............................... 260/22 CB; 525/445; 528/303
[58] Field of Search ...................... 525/445; 528/303; 260/22 R, 22 CB

[56] References Cited

U.S. PATENT DOCUMENTS

| | | | |
|---|---|---|---|
| 2,944,994 | 7/1960 | Singleton et al. | 528/303 X |
| 2,951,823 | 9/1960 | Sauer | 528/303 X |
| 3,511,792 | 5/1970 | Helm et al. | 260/22 R |
| 3,715,233 | 2/1973 | Harrier | 528/303 X |
| 3,721,642 | 3/1973 | Schalin et al. | 525/445 X |
| 3,736,278 | 5/1973 | Wada et al. | 528/303 X |
| 3,830,772 | 8/1974 | Busch et al. | 525/445 X |

Primary Examiner—Lucille M. Phynes
Attorney, Agent, or Firm—Hubbell, Cohen, Stiefel & Gross

[57] ABSTRACT

A low viscosity unsaturated polyester resin for making products, optionally reinforced with glass fibers is described, which comprises an alkyd prepared by esterification of maleic anhydride and/or acid and/or fumaric acid in association with isophtalic acid, with one or more glycols, essentially comprising dipropylene glycol, and further comprises 25–40% by weight of the total resin of an ethylenically unsaturated monomer copolymerizable with the alkyd essentially chosen among styrene and vinyl toluene, the alkyd having a molecular weight/double bond factor between 300 and 390 and an amount of free functional groups between 50 and 85 mg of KOH per g of alkyd inclusive. The products obtainable from said resin are also described. The resin behaves better in processing has lower heat development and shrinkage than the comparable prior art resins while the mechanical properties of the finished products are very good.

4 Claims, No Drawings

LOW VISCOSITY UNSATURATED POLYESTER RESINS

BACKGROUND OF THE INVENTION (a) The Field of the Invention

The present invention relates to low viscosity unsaturated polyester resins, essentially comprising an unsaturated polyester alkyd and an ethylenically unsaturated monomer copolymerizable with the alkyd. The present invention further relates to products, optionally reinforced with glass fibers, obtained from said polyester resins by the conventional unsaturated polyester processing techniques.

(b) The Prior Art

Commercial products called "unsaturated polyester resins", obtained by mixing an unsaturated polyester alkyd with a copolymerizable monomer, are known; the known polyester resins however have a higher viscosity than the resins of the present invention, the monomer content and the elastic moduls and heat distortion temperature (HDT) of the hardened pure resin being equal. In other words, the applicant has surprisingly found, and this forms an object of the present invention, that it is possible to obtain low viscosity unsaturated polyester resins with low styrene content, adapted for making products by the conventional unsaturated polyester resin processing techniques.

SUMMARY OF THE INVENTION

An object of the present invention is the low viscosity unsaturated polyester resins, for making products, optionally reinforced with glass fibres, by conventional polyester resin processing techniques, essentially comprising (A) an alkyd prepared by esterification of
 (a) maleic anhydride and/or acid and/or fumaric acid in association with isophthalic acid, with
 (b) one or more glycols, essentially comprising dipropylene glycol, and at least (B) one ethylenically unsaturated monomer, copolymerizable with (A), essentially chosen among styrene and/or vinyl toluene, in an amount of 25-40% by weight of the total (A)+(B) to be used, said unsaturated polyester resins being characterized in that an alkyd which has a molecular weight/double bonds factor comprised between 300 and 390 and an amount of free functional groups (constituted by hydroxyl groups+carboxyl groups), expressed as mg of KOH per g of alkyd, between 50 and 85 inclusive, is employed as alkyd (A).

The word "essentially" is to be construed, according to the present invention, as meaning a content higher than 90% by weight.

Preferably fumaric acid in a mixture with isophthalic acid is used as component (a); 1,2-dipropylene glycol is used as component (b); and styrene is used as component (B).

The calculation of the molecular weight/double bond factor (P.M./C=C—), to which reference is made in the description and in the claim, is hereinafter illustrated for the unsaturated polyester of Example 1, viz. a polyester based on fumaric acid, isophtalic acid and dipropylene glycol. The molecular weight of fumaric acid is 116×0.65 mols=75; the molecular weight of isophtalic acid is 166×0.35 mols=58; the molecular weight of dipropylene glycol is 134×1.0 mol=134; the sum of said three members is 267 (75+58+134); by subtracting the weight of two mols of water (2×18=36) 236 is obtained; the ratio of 231 to 0.65 (which represents the numbers of mols of double bonds), is 355, which is the value sought (factor P.M./C=C). The lower styrene content of the resins according to the invention with respect to the conventional resins, the elastic modulus and heat distortion temperature (HDT) of the hardened pure resin being equal, not only produces ecological advantages, but, in association with the particular structure of the resins which are the object of the present invention, also and particularly produces the following advantages:

(a)-during the moulding:
 (a.1) lower "washing" of the glass fibres; the term "washing" means an excessively rapid removal of the binder and a partial removal of the finishes;
 (a.2) better wettability of the glass fibers;
 (a.3) less chemical attack of the mold surface;
 (a.4) less heat development during hardening;
 (a.5) less shrinkage during hardening;

(b)-better mechanical properties of the finished product, and in particular:
 (b.1) lower inner tensions;
 (b.2) higher fatigue resistance;
 (b.3) higher impact resistance.

The process for the preparation of the unsaturated polyester resins which form an object of the present invention, does not differ from those generally known in the art, although in the preparation of the alkyd attention must be paid to the fact that the amounts of the reagents must be chosen in such a way as to obtain an alkyd having a molecular weight/double bond factor comprised between 300 and 390 and an amount of free funtional groups (constituted by hydroxyl+carboxyl groups), expressed as mg of KOH per g of alkyd, between 50 and 85 inclusive. The polyesterification reaction is carried out as usual at temperatures comprised between 150° and 260° C., in the absence or in the presence of aromatic solvents, such as xylene, toluene, etc., having the function of azeotropic agents, and in an atmosphere of an inert gas such as nitrogen, carbon dioxide, etc. At temperatures comprised between 30° and 190° C., viz. after cooling the reaction mixture once the predetermined acid number has been obtained, one may add the usual amount of conventional cross-linking inhibitors such as quinones, hydroquinones, quaternary ammonium salt, nitrophenols, sulphonic acids, etc. alone or mixed with one another.

In particular, in the non limitative case that stryene is employed as copolymerizable monomer, the following viscosity values, expressed as cps at 25° C., are obtained as a function of the amount of styrene in the total alkyd+styrene:

| % by weight of styrene on the total | Viscosity ± 10% at 25° C. |
|---|---|
| 25 | 1800 cps |
| 35 | 350 cps |
| 40 | 150 cps |

A further object of the present invention is the products obtained from the unsaturated polyester resins hereinbefore described, by the conventional unsaturated polyester resin processing techniques.

A non limitative list of techniques which may be employed for processing the unsaturated polyester resins according to the present invention, comprises e.g.

injection between coupled molds, impregnation by manual stratification, impregnation by simultaneous cutting and spraying, molding in a press at low pressure, vacuum molding, filament winding, hot molding with coupled metal molds, casting in open molds and without glass reinforcement.

DETAILED DESCRIPTION OF PREFERRED EMBODIMENTS

The following examples are illustrative and are not intended to limit in any way the present invention. The parts and percentages are by weight.

EXAMPLE 1

75 parts of fumaric acid, 58 parts of isophtalic acid and 164 parts of 1,2-dipropylene glycol are reacted in the usual manner at 190° C. and in an inert gas atmosphere.

The reaction is stopped at an acid number equal to 30 mg KOH/g of alkyd.

The alkyd thus obtained has a molecular weight per double bond factor equal to 355 and an amount of free functional groups of 60 mg KOH/g of alkyd.

200 parts of said alkyd are mixed with 110 parts of styrene containing 0.08 parts of hydroquinone.

The viscosity at 25° C. of the resin thus obtained is 255 cps.

The heat distortion temperature (HDT according to ASTM D648) of the hardened resin is 110° C.

EXAMPLE 2

From the resin obtained according to Example 1, with the suitable addition of an accelerator and a peroxide hardener, a sheet is prepared by stratification by hand which is reinforced with a mat made of cut glass fiber with a soluble binder, containing 30% glass and having a thickness of 3.5 mm and a weight of 450 g/m$^2$.

The sheet is hardened at room temperature for 24 hours and further hardened for two hours at 100° C.

Test samples are prepared from the sheet thus obtained, according to the ASTM norms, and mechanical tests are carried out.

The following values are obtained:
* Elastic bending modulus (ASTM D790) 80,000 kg/cm$^2$
* Bending breaking load (ASTM D790) 2,300 kg/cm$^2$
* Resilience IZOD (ASTM D256) 120 kg cm/cm The values are higher by 30% on the average than those of a conventional isophthalic unsaturated polyester resin, viz. a resin obtained by reacting isophthalic acid, maleic anhydride or fumaric acid and propylene glycol, having styrene as cross-linking monomer in the same amount, and reinforced with the same glass fiber in the same percentage as hereinbefore specified.

We claim:
1. Low viscosity unsaturated polyester resins for making products, optionally reinforced with glass fibers, by conventional polyester resin processing techniques, essentially comprising:
   (A) an alkyd prepared by esterification of (a) a compound selected from the group consisting of maleic anhydride, maleic acid, fumaric acid, and mixtures thereof in association with isophthalic acid, with (b) one or more glycols, essentially comprising dipropylene glycol, and at least
   (B) one monomer copolymerizable with (A), selected from the group consisting of styrene, toluene, and mixtures thereof, in an amount of 25-40% by weight of the total (A)+(B), said unsaturated polyester resins being characterized in that said alkyd A has a molecular weight/double bond factor between 300 and 390 and an amount of free functional groups constituted by hydroxyl groups+carboxyl groups, of between 50 and 85, inclusive expressed as mg of KOH per g of alkyd.
2. Polyester resins according to claim 1, wherein styrene is employed as said copolymerizable monomer, characterized by the fact that said resins have the following viscosity values, expressed as cps at 25° C., as a function of the content of styrene in the total alkyd+styrene:

| % by weight of styrene on the total | Viscosity ± 10% at 25° C. |
|---|---|
| 25 | 1800 cps |
| 35 | 350 cps |
| 40 | 150 cps |

3. Unsaturated polyester resins according to either claim 1 or 2, characterized by the fact that as component (a) fumaric acid mixed with isophtalic acid is employed; as component (b) 1,2-dipropylene glycol is employed and as component (B) styrene is employed.
4. The polyester resins according to either of claims 1 or 2, wherein said resins are processed into final products by a process selected from injection between coupled moulds, impregnation by manual stratification, impregnation by simultaneous cutting and spraying, moulding in a press at low pressures, vacuum moulding, filament winding, hot moulding with coupled metal moulds, or casting with open moulds and without glass reinforcement.

* * * * *